United States Patent
Wang

(10) Patent No.: US 11,453,751 B2
(45) Date of Patent: Sep. 27, 2022

(54) POLYIMIDE (PI) SUBSTRATE AND METHOD FOR FABRICATING SAME

(71) Applicant: WUHAN CHINA STAR OPTOELECTRONICS SEMICONDUCTOR DISPLAY TECHNOLOGY CO., LTD., Wuhan (CN)

(72) Inventor: Yamin Wang, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 470 days.

(21) Appl. No.: 16/615,376

(22) PCT Filed: Nov. 6, 2019

(86) PCT No.: PCT/CN2019/115991
§ 371 (c)(1),
(2) Date: Nov. 20, 2019

(87) PCT Pub. No.: WO2020/232986
PCT Pub. Date: Nov. 26, 2020

(65) Prior Publication Data
US 2021/0355278 A1  Nov. 18, 2021

(30) Foreign Application Priority Data

May 23, 2019 (CN) .......................... 201910434466.5

(51) Int. Cl.
B32B 15/04 (2006.01)
B32B 17/06 (2006.01)
(Continued)

(52) U.S. Cl.
CPC .......... *C08G 73/1039* (2013.01); *C03C 17/32* (2013.01); *C03C 17/3405* (2013.01);
(Continued)

(58) Field of Classification Search
CPC .................................................. C03C 17/3405
(Continued)

(56) References Cited

U.S. PATENT DOCUMENTS

2015/0210048 A1* 7/2015 Jeong .................. C03C 17/3405
428/212
2018/0042116 A1* 2/2018 Huang ................ H01L 23/4985
2019/0036024 A1* 1/2019 Bai ..................... H01L 51/0097

FOREIGN PATENT DOCUMENTS

CN 104487241 A 4/2015
CN 105789243 A 7/2016
(Continued)

*Primary Examiner* — Lauren R Colgan
(74) *Attorney, Agent, or Firm* — Benesch, Friedlander, Coplan & Aronoff LLP

(57) ABSTRACT

A polyimide (PI) substrate, including a glass substrate is provided, wherein a first PI layer is disposed over the glass substrate, and a second PI layer is disposed over the first PI layer. The first PI layer is formed with a first PI material, and the second PI layer is formed with a second PI material. Disposal of the second PI layer over the first PI layer allows for manual and complete peeling of the second PI layer from the first PI layer.

9 Claims, 3 Drawing Sheets

(51) Int. Cl.
*C08G 73/10* (2006.01)
*C03C 17/32* (2006.01)
*C03C 17/34* (2006.01)

(52) U.S. Cl.
CPC ...... *C08G 73/1071* (2013.01); *C03C 2217/90* (2013.01); *C03C 2218/152* (2013.01); *C08G 73/1014* (2013.01)

(58) Field of Classification Search
USPC ......................................................... 428/426
See application file for complete search history.

(56) References Cited

FOREIGN PATENT DOCUMENTS

| | | | |
|---|---|---|---|
| CN | 105789440 A | 7/2016 |
| CN | 108586744 A | 9/2018 |
| CN | 110212090 A | 9/2019 |
| EP | 0474054 A2 | 3/1992 |

* cited by examiner

POLYIMIDE (PI) SUBSTRATE AND METHOD FOR FABRICATING SAME

FIELD OF INVENTION

The present application relates to the field of flat display technologies, and more particularly to a polyimide (PI) substrate used in the field of flat display technologies and a method for fabricating the same.

BACKGROUND

It is known that more and more new optoelectronic devices, such as OLED panels and solar panels, are developing towards flexible, light, and thin directions. The flexibility of the optoelectronic devices greatly depends on the material used in the substrate.

In this regard, polyimide (PI) materials have developed by the industry, and flexible, light and thin performances thereof meet material requirements for flexible substrates of the industry. However, optoelectronic devices of various performances have different performance requirements based on the PI materials used therein, so this led to the continuous development of PI materials in the industry.

Taking the optoelectronic devices in the field of the organic light-emitting diode (OLED) as an example, the flexible substrate used therein is one of the core problems that it is difficult to overcome. This is because, if a specifically functioning optoelectronic device needs to have flexible, light, and thin functions, the PI material used therein needs to have a comprehensive good performance, and this comprehensive good performance also is needed to be proofed by a variety of performance tests. Therefore, it is necessary to perform various performance tests to the PI layer composed of the used PI material.

In the performance tests, the industry has encountered a problem that the polyimide film is difficult to be manually peeled off after the film is formed. This is because the polyamic acid formed in the intermediate step of the film forming process of the PI material normally used in the industry easily forms a strong ester group structure with the hydroxyl group on the hydrophilic glass substrate during the high-temperature curing process. In this way, it is difficult to manually peel off it after film formation, and operations to peel off the film are very complicated.

Further, even if sampling of the PI layer after the film formation and the subsequent performance tests can be done, the glass substrate for forming the film is only scrapped by the industry after the sampling, which is a waste and increases the cost of testing in some extents.

Therefore, there is a need to develop a new PI substrate for testing to overcome the drawbacks of the prior art.

SUMMARY

One aspect of the present application provides a PI substrate provided with a novel laminated PI layer structure such that it only needs to peel off the upper PI layer for performance testing of the sampled layer for subsequent PI layer testing. The remaining lower PI layer is still disposed over the substrate, and the subsequent production can be continued. Therefore, two operations can be performed simultaneously, and this takes great significance in panel's mass production and reduces mass production costs.

Technical solutions of the present applications are:

The present application provides a polyimide (PI) substrate, comprising a glass substrate, wherein a first PI layer is disposed over the glass substrate; a second PI layer is disposed over the first PI layer; the first PI layer is formed with a first PI material; the second PI layer is formed with a second PI material; and disposal of the second PI layer over the first PI layer allows for manual and complete peeling of the second PI layer from the first PI layer.

Furthermore, the peeled off second PI layer can be used for subsequent PI layer performance tests, and the glass substrate comprising the first PI layer can be used for subsequent product production. These two operations can individually proceed, and no interference therebetween is formed. Compared with the single PI layer substrate in the prior art that the remaining glass substrate can only be scrapped after the PI layer on the glass substrate is peeled off and sampled, the present application disposes an additional second PI layer to proceed sampling and testing, and the remaining first PI layer is still disposed above the glass substrate to form a complete PI substrate which continues to proceed the subsequent production and no waste is caused, which has a significant meaning to production of display panels, saving great costs for large batches of panel production.

In addition, regarding the single PI layer substrate in the prior art, the operation of peeling off and sampling the PI layer disposed on the glass substrate is very cumbersome. It is typically necessary to first immerse the substrate in deionized water for 3 to 5 days, and then the PI layer thereon can be manually peeled off and sampled. According to the dual PI layer structure of the present application, relative to the lower PI layer, peeling off the upper PI layer can be directly realized by a manual operation, and the operation is very easy. The surface of the peeled off PI layer has good flatness, and there is no problem such as the peeled off PI layer having a naturally curved surface in the prior art.

Furthermore, in various embodiments, a third PI layer is further disposed over the second PI layer, and the third PI layer is formed with a third PI material.

Furthermore, in various embodiments, the first PI material of the first PI layer and the second PI material of the second PI layer are the same PI material.

Furthermore, in various embodiments, the first PI material of the first PI layer and the second PI material of the second PI layer are different PI materials.

Furthermore, in various embodiments, wherein the first PI layer is formed with the first PI material that comprises a polyimide composite having a following general molecular formula (refer to general formula I in the following):

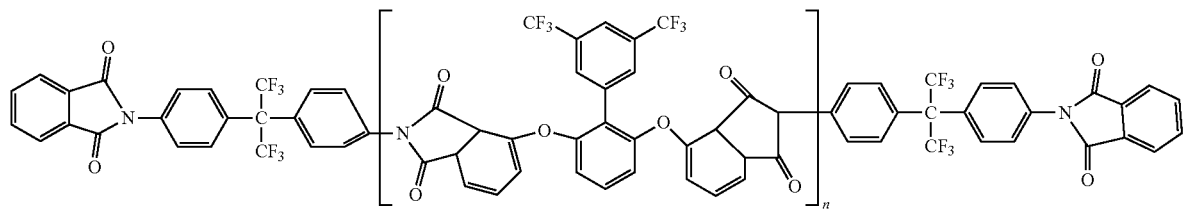

Furthermore, in various embodiments, raw materials used for fabricating the polyimide composite of the general molecular formula I comprise compound A: 2,4-bis(trifluoromethyl) dianhydride, compound B: 2,4-bis(trifluoromethyl)p-aniline, and compound C: phthalic anhydride.

Furthermore, in various embodiments, a mole ratio between compound A and compound B is 1:3.

Furthermore, in various embodiments, wherein a mole ratio between compound C and a mixture of compound A and the compound B (C:A/B) is 1: 1-4.

Furthermore, still another embodiment of the present invention provides a method for fabricating a polyamic acid precursor solution for fabricating the polyimide composite according to the present application, comprising the following steps:

The compound A: 2,4-bis(trifluoromethyl)dianhydride and the compound B: 2,4-bis(trifluoromethyl)p-aniline of the raw materials are added to a mixture of N,N-dimethylhexanamide and N-methylpyrrolidone, and then stirring thereof;

The compound C: phthalic anhydride of the raw materials is added to the above stirring mixture and then stirring for 24-96 hours under 20-40 degrees to fully dissolve thereof;

Performing suction filtration in a vacuum environment, and evacuat the solution obtained by the suction filtration by a vacuum pump for 0.8-1.5 hours to remove air bubbles in the solution;

Standing the evacuated solution still at room temperature for 2-4 hours to obtain a polyamic acid precursor solution of the PI material of the polyimide composite.

Furthermore, in various embodiments, the PI material used in the first PI material and/or the second PI material is not limited to the PI material represented by the above molecular structure formula, and maybe other PI materials known in the industry for forming the PI layer. The PI material having the molecular structure of the general molecular formula I disclosed above is only an illustrative example of the PI material involved in the PI substrate according to the present application.

Furthermore, another aspect of the present application provides a method for fabricating the PI substrate, comprising the following steps:

providing a glass substrate;

providing and coating a polyamic acid precursor solution of the first PI material over the glass substrate, and performing a first high-vacuum chemical drying (H-VCD) treatment to remove 50-80% solvents therein, and then performing a first recipe to crosslink and cure thereof, thereby forming the first PI layer over the glass substrate; and coating a polyamic acid precursor solution of the second PI material over the first PI layer, and performing a second H-VCD treatment to remove 50-80% solvents therein, and then performing a second recipe to crosslink and cure thereof, thereby forming the second PI layer over the glass substrate.

Furthermore, in various embodiments, the polyamic acid precursor solution of the first PI material is coated over the glass substrate with a slit coater.

Furthermore, in various embodiments, the first H-CVD treatment removes 65-75% solvents in the polyamic acid precursor solution of the first PI material coated over the glass substrate under 110-130° C.

Furthermore, in various embodiments, in the first and/or the second recipe, a max temperature is 430-500° C., a rate of raising temperature is 4-8° C./min, times of increasing temperature are 1-5 times, and a rate of lowering temperature is 4-8° C./min.

Furthermore, in various embodiments, the polyamic acid precursor solution of the second PI material is coated over the first PI layer with a slit coater.

Furthermore, in various embodiments, the first H-CVD treatment removes 65-75% solvents in the polyamic acid precursor solution of the second PI material coated over the glass substrate under 110-130° C.

Furthermore, in various embodiments, in the second recipe, a max temperature is 430-500° C., a rate of raising temperature is 4-8° C./min, times of increasing temperature are 1-5 times, and a rate of lowering temperature is 4-8° C./min.

The present application provides a polyimide (PI) substrate and a method for fabricating the same, wherein the peeled off second PI layer can be used for subsequent PI layer performance tests, and the glass substrate comprising the first PI layer can be used for subsequent product production, unlike the single layer PI substrate in the prior art, that the remaining glass substrate can only be scrapped after the PI layer on the glass substrate is peeled off and sampled.

Furthermore, the peeled-off upper PI layer can proceed sampling and testing, and the remaining first PI layer is still disposed above the glass substrate to form a complete PI substrate and continue to proceed the subsequent production, which has a significant meaning to production of display panels, saving great costs for large batches of panel production.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

The technical solution of a PI substrate and a fabrication method thereof according to the present application will be further described in detail below with reference to the accompanying drawings and embodiments.

Figure 1:
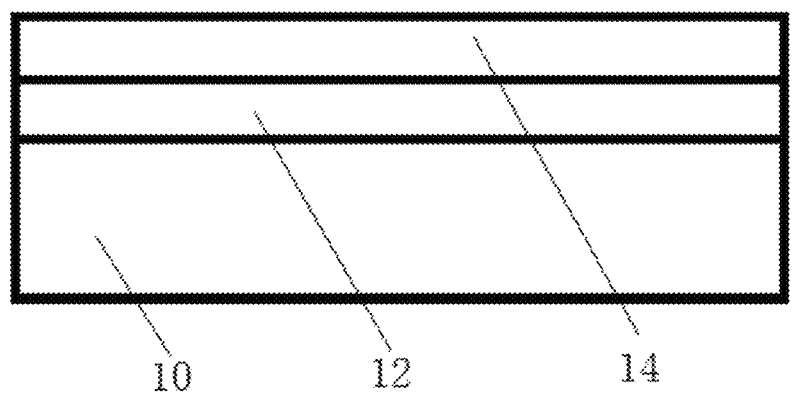
FIG. 1 is a polyimide (PI) substrate according to an embodiment of the present application.
Figure 2:
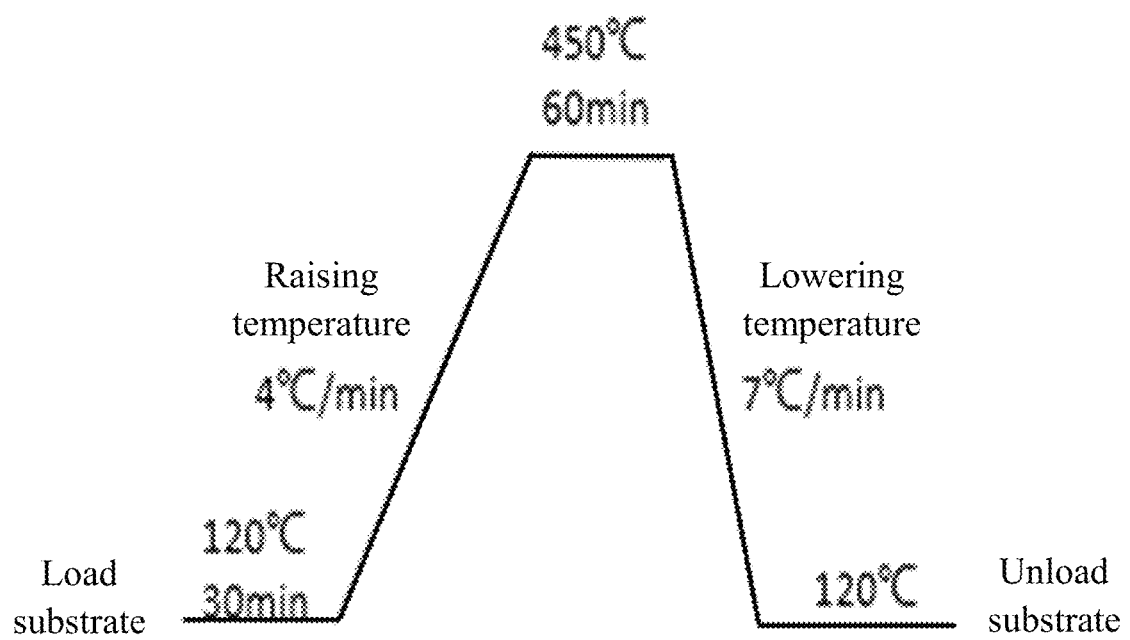
FIG. 2 is a schematic process diagram showing a recipe according to an embodiment of the present application.
Figure 3:
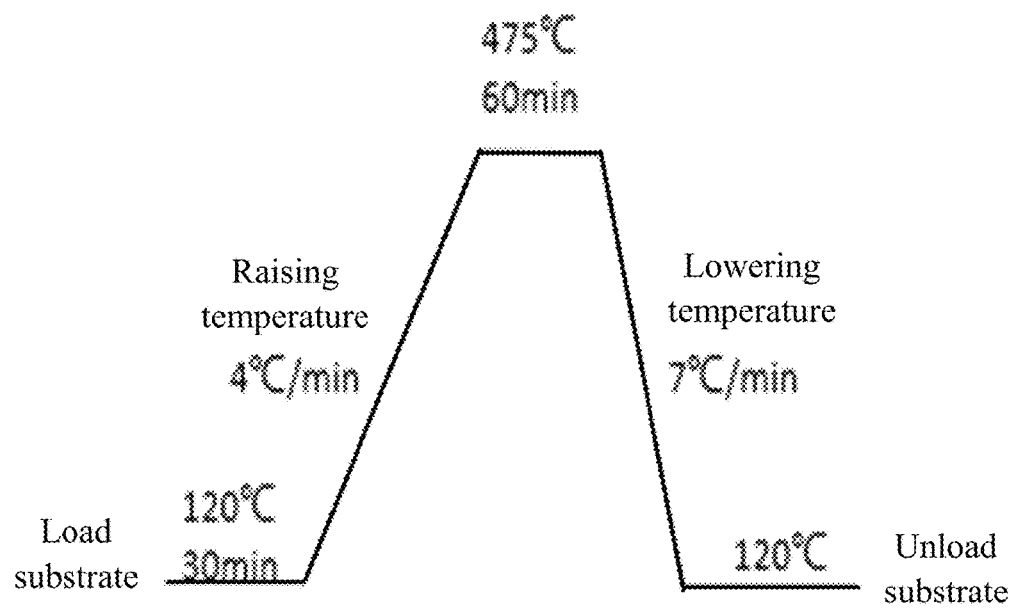
FIG. 3 is a schematic process diagram showing a recipe according to another embodiment of the present application.
Figure 4:
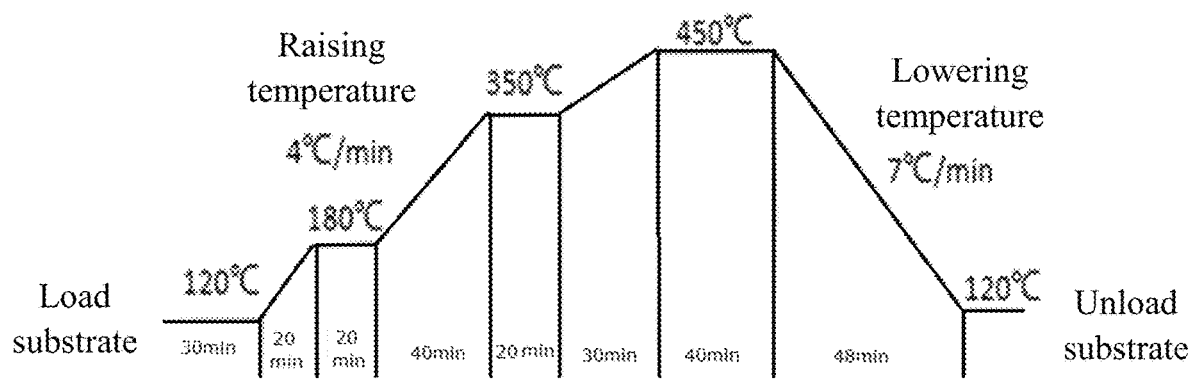
FIG. 4 is a schematic process diagram showing a recipe according to yet another embodiment of the present application.
Figure 5:
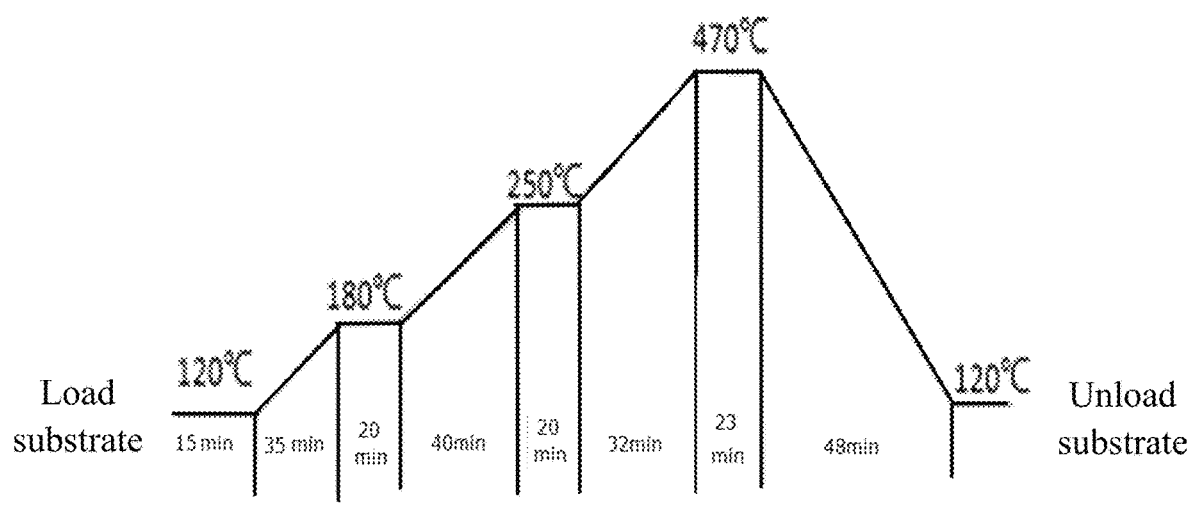
FIG. 5 is a schematic process diagram showing a recipe according to another embodiment of the present application.

Referring to FIG. 1, an embodiment of the present application provides a polyimide (PI) substrate, comprising a glass substrate.

A first PI layer 12 is disposed over the glass substrate 10, and a second PI layer 14 is disposed over the first PI layer 12. The first PI layer 12 is formed with a first PI material, and the second PI layer 14 is formed with a second PI material. Disposal of the second PI layer 14 over the first PI layer 12 allows for manual and complete peeling off the second PI layer 14 from the first PI layer 12.

The peeled off second PI layer 14 can be used for subsequent PI layer performance tests, and the glass substrate 10 comprising the first PI layer 12 can be used for subsequent product production. These two operations can individually proceed, and no interference therebetween is formed. Compared with the single PI layer substrate in the prior art that the remaining glass substrate can only be scrapped after the PI layer on the glass substrate is peeled off and sampled, the present application disposes an additional second PI layer 14 to proceed sampling and testing, and the remaining first PI layer 12 is still disposed above the glass substrate 10 to form a complete PI substrate and continue to proceed the subsequent production and no waste is caused, which has a significant meaning to production of display panels, saving great costs for large batches of panel production.

In addition, regarding the single PI layer substrate in the prior art, the operation of peeling off the sample from the PI layer disposed on the glass substrate is very cumbersome. It is typically necessary to first immerse the substrate in deionized water for 3 to 5 days, and then the PI layer thereon can be manually peeled off and sampled. According to the dual PI layer structure of the present application, relative to the lower PI layer, peeling off of the upper PI layer can be directly realized by manual operation, and the operation is very easy. The surface of the peeled off PI layer has good flatness, and there is no problem such as the peeled off PI layer having a naturally curved surface in the prior art.

Furthermore, in various embodiments, the number of PI layers disposed over the glass substrate 10 is not limited to the two layers, and may be a multi-layer structure according to requirements, for example, 3 layers, 4 layers, 5 layers, etc., and may be determined as needed, and are not limited.

Furthermore, in various embodiments, wherein the first PI material of the first PI layer 12 and the second PI material of the second PI layer 14 are the same PI material, or different PI materials may be determined as needed, and are not limited.

Furthermore, in various embodiments, wherein the first PI layer is formed with the first PI material that comprises a polyimide composite having a following general molecular formula (refer to general formula I in the following):

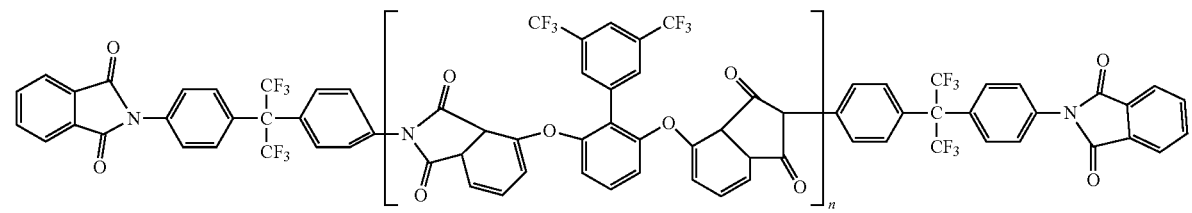

Regarding the polyimide composite of the present application, it is fabricated first by introducing a fluorine-containing polyamic acid solution obtained from 2,4-trifluoromethyl dianhydride having benzene rings, conventional dianhydride of sealed terminal groups, and fluorine-containing p-phenylenediamine. The fluorine-containing polyamic acid solution is applied to a glass substrate to form the PI layer. The formed PI layer can be peeled off manually, thereby providing good test samples for sequential property tests, especially for tests such as extension property tests, curing property tests, coefficient of thermal expansion tests, which are property tests of higher requests to the sample test.

Furthermore, the polyimide composite according to the present application can be widely used in an OLED factory, a semiconductor factory, etc., and has broad application and market prospects.

Further, in order to avoid unnecessary repetition, the polyimide composite according to the present invention will be further described in detail below in conjunction with the fabrication method of the polyimide composite according to the present application. The fabrication of the polyimide composite comprises two phases: a first phase is a preparation phase of a polyamic acid precursor solution, and a second phase is a film formation phase.

The fabrication raw materials used in the polyamic acid precursor solution in the first phase comprises compound A: 2,4-bis(trifluoromethyl) dianhydride, compound B: 2,4-bis(trifluoromethyl) p-aniline, and compound C: phthalic anhydride.

The structural general formula of the compound A, compound B, and compound C are respectively provided as follows:

Compound A

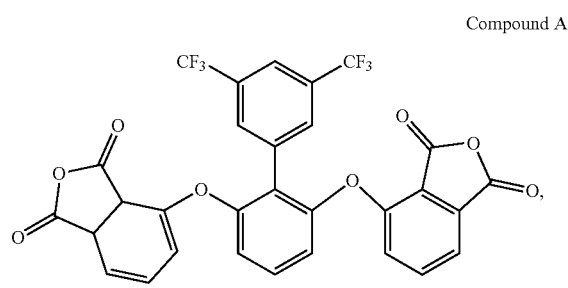

-continued

Compound B

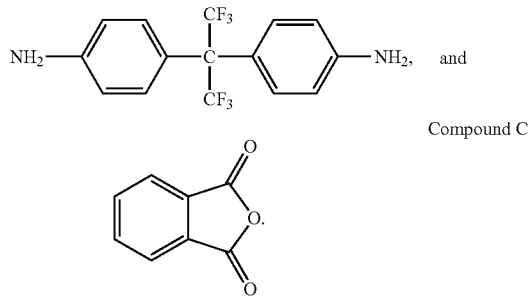

and

Compound C

The first phase comprises the following steps;

0.1-10 mmol of compound A: 2,4-bis(trifluoromethyl) dianhydride and 0.1-10 mmol of compound B: 2,4-bis (trifluoromethyl)p-aniline of the raw materials are weighted and added to a two-neck flask having a mixture of N,N-dimethylhexanamide and N-methylpyrrolidone in a mole ratio A:B 1: 1-3, and then the two-neck flask is removed to a mechanical stirring device to stir thereof.

0.1-5 mmol of compound C: phthalic anhydride of the raw materials is added to the above stirring mixture in a mole ratio C:A/B 1: 1-4, and the compound C is added to the two-neck flask spoon by spoon, and the mixture is then stirred for 24-96 hours to fully dissolving thereof.

The mechanical stirring device is removed and suction filtration is performed in a vacuum environment, and the solution obtained by suction filtration is evacuated by a vacuum pump for 0.8-1.2 hours to remove air bubbles in the solution.

The evacuated solution is stood still at room temperature (20-40° C.) for 2-4 hours to reduce the air bubbles in the solution until there is no air bubble is found. At this time, the first phase is finished. A general structural formula of the polyamic acid according to the present application is shown as following:

The second phase comprises the following steps:

After removing the air bubbled, the polyamic acid precursor solution is coated over the glass substrate by a slit coater, and a first high-vacuum chemical drying (H-VCD) treatment is performed to remove 70% solvents therein, and then a first recipe is performed to crosslink and cure thereof, thereby forming a PI layer. The structural general formula of the polyimide composite in the PI material of the PI layer is the above formula I.

Furthermore, in the first and/or the second recipe, a max temperature is 430-500° C., a rate of raising temperature is 4-8° C./min, times of increasing temperature are 1-5 times, and a rate of lowering temperature is 4-8° C./min. More specifically, as shown in FIGS. 2-5, various schematic process diagrams of four different recipes are shown.

Furthermore, another aspect of the present application provides a method for fabricating the PI substrate, comprising the following steps:

providing a glass substrate;

providing and coating a polyamic acid precursor solution of the first PI material over the glass substrate by a slit coater, and performing a first high-vacuum chemical drying (H-VCD) treatment to remove 70% solvents therein, and then performing a first recipe by a flexible film dryer to crosslink and cure thereof, thereby forming the first PI layer over the glass substrate. This layer PI layer may function as a substrate for a first testing layer.

Next, a polyamic acid precursor solution of the second PI material is coated over the first PI layer again by the slit coater, and performing a second H-VCD treatment to remove 70% solvents therein, and then performing a second recipe by a flexible film dryer to crosslink and cure thereof, thereby forming the second PI layer over the glass substrate. Therefore, the PI substrate structure having the dual PI layer of the present application is completed.

The parameters involved in the first recipe and the second recipe are preferably the recipe parameters disclosed above, but may also be other recipe parameters known in the industry, depending on the selected PI material for specific selections, and there is no limit.

One aspect of the present application provides a PI substrate that is provided with a novel laminated PI layer structure such that it only needs to peel off the upper PI film layer for performance testing of the sampled layer during subsequent PI layer testing. The remaining lower PI film layer is still disposed over the substrate, and the subsequent production can be continued. Therefore, two operations can be performed simultaneously, and this takes great significance in mass production of panels and reduces mass production costs.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A polyimide (PI) substrate, comprising a glass substrate, wherein:
   a first PI layer is disposed over the glass substrate;
   a second PI layer is disposed over the first PI layer;
   the first PI layer is formed with a first PI material that comprises a polyimide composite of a following general molecular formula:

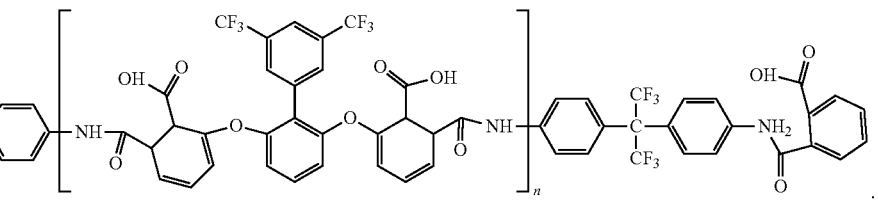

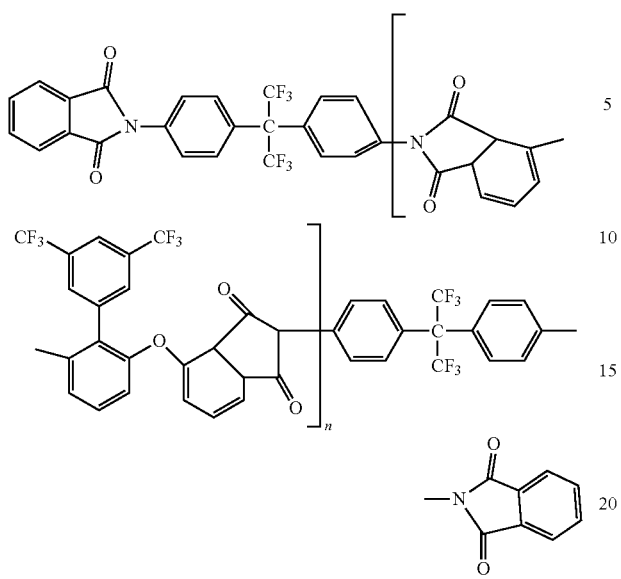

the second PI layer is formed with a second PI material; and disposal of the second PI layer over the first PI layer causes completely peeling off the second PI layer from the first PI layer.

2. The PI substrate as claimed in claim 1, wherein a third PI layer is further disposed over the second PI layer, and the third PI layer is formed with a third PI material.

3. The PI substrate as claimed in claim 1, wherein the first PI material of the first PI layer and the second PI material of the second PI layer are the same PI material.

4. The PI substrate as claimed in claim 1, wherein raw materials for fabricating the polyimide compound comprise:

compound A: 2,4-bis(trifluoromethyl) dianhydride;
compound B: 2,4-bis(trifluoromethyl) p-aniline; and
compound C: phthalic anhydride.

5. The PI substrate as claimed in claim 4, wherein a mole ratio between the compound A and compound B is 1:3.

6. The PI substrate as claimed in claim 4, wherein a mole ratio between the compound C and a mixture of the compound A and the compound B (C:AB) is 1:1-4.

7. A method for fabricating the PI substrate as claimed in claim 1, comprising the following steps:

providing a glass substrate;

providing and coating a polyamic acid precursor solution of the first PI material over the glass substrate, and performing a first high-vacuum chemical drying (H-VCD) treatment to remove 50-80% solvents therein, and then performing a first recipe to crosslink and cure thereof, thereby forming the first PI layer over the glass substrate; and coating a polyamic acid precursor solution of the second PI material over the first PI layer, and performing a second H-VCD treatment to remove 50-80% solvents therein, and then performing a second recipe to crosslink and cure thereof, thereby forming the second PI layer over the first PI layer.

8. The method for fabricating the PI substrate as claimed in claim 7, wherein the first H-CVD treatment removes 65-75% solvents in the polyamic acid precursor solution of the first PI material coated over the glass substrate under 110-130° C.

9. The method for fabricating the PI substrate as claimed in claim 7, wherein in the first and/or the second recipe, a max recipe temperature is 430-500° C., a rate of raising temperature is 4-8° C./min, times of raising temperature are 1-5 times, and a rate of lowing temperature is 4-8° C./min.

* * * * *